United States Patent Office 3,219,685
Patented Nov. 23, 1965

3,219,685
PROCESS FOR THE RECOVERY OF UNSATURATED ALIPHATIC NITRILES FROM GAS
Otto Roelen, Oberhausen-Holten, and Walter Rottig, Oberhausen-Sterkrade-Nord, Germany, assignors to Ruhrchemie Aktiengesellschaft, Oberhausen-Holten, Germany, a German corporation
No Drawing. Filed Nov. 8, 1961, Ser. No. 151,102
Claims priority, application Germany, Nov. 12, 1960, R 29,024; Apr. 18, 1961, R 30,115; June 12, 1961, R 30,514
5 Claims. (Cl. 260—465.3)

This invention relates to a process for the recovery of unsaturated aliphatic nitriles from gases.

This invention is of particular value in that it provides a practical and economical method for the recovery of unusaturated aliphatic nitriles from gaseous reaction mixtures obtained in the oxidation of an olefin containing at least 3 carbon atoms, and, in particular, of acrylonitrile.

Acrylonitrile and its homologs are produced to an increasing extent by the process of contacting a gaseous mixture comprising an aliphatic olefin having from 3 to 6 carbon atoms, and preferably from 3 to 4 carbon atoms, amonia, oxygen, and water vapor, in the presence of a catalyst. The recovery of the unsaturated nitrile from the reaction gas is generally effected by intense cooling or by scrubbing processes. While water is frequently used as the scrubbing agent or solvent, low molecular weight alcohols, glycols, etc., are also suitable, as has been demonstrated in German Patents 1,070,170 and 941,428.

As the solubility of the unsaturated nitriles, and in particular of acrylonitrile in water, is relatively poor while its vapor pressure is rather high, it is necessary to effect the scrubbing operation in several stages and with large amounts of water, if the acrylonitrile produced is to be removed from the reaction gases in satisfactory yields. The resulting expense both in energy and investment costs is relatively high.

One of the objects of this invention is to provide a commercially practicable method for recovery of unsaturated aliphatic nitriles from reaction mixtures produced by oxidizing olefinic hydrocarbons.

Another object of the invention is to provide a method of recovering unsaturated aliphatic nitriles from their reaction mixtures whereby there results the recovery of substantial portions of the unsaturated nitrile product.

Another object of the invention is to provide a method of recovering acetonitrile and hydrocyanic acid from their reaction mixtures.

According to the present invention there is provided a more advantageous process for recovering unsaturated aliphatic nitriles from their gaseous reaction mixtures by scrubbing the same with, as scrubbing agent, an aliphatic alcohol having from 4 to 12 carbon atoms and preferably from 6 to 10 carbon atoms, or mixtures of such alcohols, at a temperature below 20° C., and preferably below 0° C. and at atmospheric or superatmospheric pressure.

The process of the invention is carried out as follows:

The exit gas from the catalytic oxidation of aliphatic olefins which may have been used in admixture with saturated hydrocarbons and which is carried out in the presence of ammonia, oxygen and water vapor leaving a reacting zone is first passed through an air-cooled condenser wherein a portion of the water present is condensed out. Thereafter, the gas passes into a water-cooled condenser in which further amounts of water and small portions of the reaction product are separated out. Preferably, the water separated out in these two condensation steps should amount to from 90%, and preferably 95%, of the water present. After separation of the substantial amounts of water from the reaction gas, the gas is passed into an alcohol scrubbing unit.

The alcohol scrubbing unit comprises at least two and, advantageously, a greater number of stages, in the first of which as much of the residual water as still is present is removed, while, simultaneously, there is removed by the scrubbing a part of the reaction products. If the amount of reaction products contained in the reaction gas is very high, it is possible to operate the first stage without any scrubbing but as a simple cooling stage which itself may serve to separate a large portion of the nitrile product. In general, however, this first stage will be operated with a scrubbing agent as a scrubbing step.

As scrubbing agents for use in the first stage, there may be used alcohols having from 4 to 12 carbon atoms, alcohols having between 6 and 10 carbon atoms having been found to be particularly suitable. The scrubbing may be carried out with, as scrubbing agent, a single alcohol or with an alcohol mixture. When an alcohol mixture is employed, it has been found preferably to employ mixtures the components of which have the same number of carbon atoms—i.e., an isomeric mixture. When mixtures of alcohols having different numbers of carbon atoms are employed, it is advantageous to use alcohols of the boiling points which differ by less than 50° C., and preferably by less than 25° C. from one another. Branched chain alcohols and their mixtures, as well as alcohols produced according to oxo synthesis, have been found to have been very satisfactory for use as scrubbing agents in accordance with the invention. In particular, it has been found that the structure and composition of the oxo alcohols give particularly good results.

The scrubbing stage may be effected using a concurrent flow, and even more advantageously, counter-current flow through a packing ring, as, for example, Raschig ring packed apparatus. Other scrubbing procedures utilizing any apparatus of the type suitable for scrubbing, as, for example, scrubbers equipped with nozzles through which the scrubbing agent is sprayed, as well as scrubbers equipped with bubble cap trays or sieve trays may be employed in the execution of the process.

The first scrubbing stage, according to the invention, may be effected advantageously under the conditions of pressure existing in the reaction zone in which the catalytic oxidation takes place. This pressure generally amounts to 1–3 kg./cm.$^2$ gauge and is dependent upon the gas pressure necessary to overcome the resistance offered to the flow by the fixed bed catalysts in the reactor. It may be advantageous to effect the scrubbing at a pressure which is higher than used in the preceding stage, pressures up to about 20 kg./cm.$^2$ gauge being permissible.

The temperature used in the first scrubbing stage is dependent upon that used in the second stage. If, in the latter stage, the scrubbing is carried out at temperatures within the range of room temperature to as low as about 0° C., the first stage will preferably be operated at about the same temperature. However, the second stage temperature will generally be maintained in the range of from below 0° C. to as low as about −50° C., and then preferably the first scrubbing stage will be maintained at temperatures of between 0° and −30° C., and, most preferably, between −5° and −20° C. The use of even lower temperatures is not desirable as they may be the cause of ice troubles.

In carrying out the process of the invention, the loading rate used in the first stage may be varied within wide limits and is dependent upon the prevailing conditions and, in particular, on the quantity and concentration of the reaction products contained in the reaction gas, as well as on the amounts of water remaining in the gas after condensation and on the design and efficiency of the scrubbing unit and/or scrubbing method used. Finally, the loading is dependent on the extent to which the loaded scrubbing alcohol is withdrawn and whether the withdrawal is effected intermittently or continuously. When consideration is given to all of these factors, the loading should be preferably maintained at about 50 to 10,000 liters pe liter of scrubbing liquid.

The second stage represents the scrubbing stage proper and generally is composed of but one unit, but, again, may also comprise several units connected either in series or in parallel. Although the second stage may be operated in a temperature range of between about +20 and 0° C., by employing a temperature range of between about 0 and −50° C., and preferably between 0 and −30° C., more favorable results are obtained. Counter-current flow has been found to be particularly advantageous in this stage. The pressure is maintained so as to correspond to that which is used in the preceding stage. The loading or flow rate utilized is of the same order as that in the first stage. By decreasing the flow rate as compared with that of the first stage, for example ½ to ⅟₁₀ of the preceding stage, the advantage is gained of an extremely high efficiency in the scrubbing operation. As scrubbing agents, there are used the same alcohols as indicated above as first stage scrubbing materials.

The unsaturated aliphatic compounds removed from the gaseous reaction mixture by the scrubbing and contained in the alcohol used as the scrubbing agent and, in particular, acrylonitrile and acetonitrile, are recovered therefrom by rectification in a suitable fractionating distilling apparatus. The rectification may be effected either batchwise or continuously and is, in general, carried out at atmospheric pressure, although it is possible to use slightly reduced pressures. The unsaturated compounds obtained and especially acrylonitrile and acetonitrile are characterized by a high degree of purity. As a result of the small amount of water contained in the alcohol which is used as the scrubbing medium the acrylonitrile contains only the dissolved amount of water (about 3%) as the azeotrope which contains 16% of water separates into two phases after cooling, the upper phase constituting pure acrylonitrile having the aforesaid amount of dissolved water. A further advantage of the small amount of water present resides in the fact that frequently a part of the acrylonitrile is obtained in a substantially water-free state. The acetonitrile is directly obtained in a completely water-free state, this being an advantage which cannot be realized where the scrubbing operation is effected with water.

Where, in the carrying out of the scrubbing process, ammonium carbonates are deposited out, the efficiency of the scrubbing operation may be improved if the alcohol scrubbing of the reaction gases is preceded by an initial scrubbing with water. The water scrubbing unit is preferably dimensioned so as to have a scrubbing capacity not exceeding 70% of the low-temperature alcohol scrubbing unit, a capacity equal to 20 to 50% of the alcohol scrubbing unit sufficing in most instances.

The linear gas flow velocity in the water scrubbing unit is maintained relatively high thereby to a substantial degree repressing the scrubbing out into the water of the reaction product, i.e., acrylonitrile, hydrocyanic acid, etc. Velocities of more than 5 cm./second but not more than about 60 cm./second have been found to be useful, and preferably velocities of between 10 and 50 cm./second are applied. The velocities should be adjusted to the constructional design and the particular embodiment of the scrubbing unit corresponding to the optimum state of the art.

The water scrubbing step is generally carried out at room temperature—that is, at about 20° C. However favorable results are obtained using both higher and lower temperatures and, namely, temperatures within the range of 0 to 50° C.

The water scrubbing process is preferably effected with counter-current flow and continuously, but satisfactory operation is also possible with intermittent operation as, for example, with a daily renewed water supply, in which case the use of packing material may be dispensed with under certain circumstances.

The pressure used in carrying out the scrubbing with water is preferably maintained sufficiently high so that it corresponds to the pressure of the overall condensing system as utilized in recovering the raw acrylonitrile—i.e., it generally amounts to somewhat above atmospheric pressure and may amount to a maximum of about 11 kg./cm².

The ammonium carbonate accumulated in the scrubbing water may amount to about 40% and is largely dependent upon the temperature used in the scrubbing unit, upon the $CO_2/NH_3$— partial pressure in the incoming gas, upon the degree of scrubbing desired and other variables. In general, a loading of the scrubbing water with about 10 to 25% by weight of ammonium carbonates can be considered sufficiently great.

The efficiency of the water scrubbing unit is improved by acidifying the scrubbing water by addition thereto of acids so as to obtain water having a pH value of between 1 and 6 and preferably between 2 and 5. The adjustment of the acidity of the water is preferably effected with a mineral acid. In order that this value be maintained at a constant level, it is preferred to introduce continuously into the water scrubbing unit a sufficient amount of acid so that, based on the ammonia entering the unit, stoichiometric equivalence is obtained. The maintenance of these conditions is assured by the analytical determination of the amount of ammonia present in the gas prior to its entering the water scrubbing unit. If polybasic acids are used, it is preferable, according to the invention, that sufficient acid is added so that the formation of acid salts is made possible. Thus, as, for example, in the case of sulfuric acid, the formation of not only $(NH_4)_2SO_4$ but also of $NH_4HSO_4$ may occur and must be taken into consideration. The amount of acid may further be regulated so that mixtures of neutral salts and of acid salts may be formed.

While mineral acids are prefearbly used, organic acids, such as formic acid, acetic acid, etc., may also be advantageously employed. Among the mineral acids, sulfuric acid and phosphoric acid have been found to be particularly suitable. The acids may be added in a concentrated form but are preferably diluted with water and added, for example, as an 80% or 70% acid solution. About 10% acid is generally the maximum dilution which can be used in order that an excessive increase in volume of the scrubbing liqiud be avoided. The degree of dilution to be selected is dependent upon the amount of ammonia in the incoming gas as well as upon the concentration of acrylonitrile or acetonitrile therein, and on additional factors.

The scrubbing unit proper may comprise a simple liquid tower filled with packing material and provided with internal distributing devices, as, for example, spray nozzles, or other suitable apparatus of the type known in the art. It has, however, been found to be preferable in any case to introduce the acids directly into the liquid phase.

In the continuous operation of the scrubbing unit using a continuous supply of fresh acid, the liquid volume will be constantly increasing and at the same time the salt content of the aqueous phase will also be increasing. The normal loading of the scrubbing system is maintained by continuously or intermittently withdrawing the excess amount of liquid. The concentration of the salt present in the scrubbing solution may be driven almost to saturation so that a satisfactory salt, as, for example, ammonium sulfate or ammonium phosphate, is recovered upon evaporation of the scrubbing solution.

Operation of the scrubbing system at an elevated temperature of about 70° to 80° C. results in a two-fold advantage being obtained. On the one hand, the solubility of the salt is increased and, therefore, permits an increased concentration, and, on the other hand, a part of the salt crystallizes directly in pure form upon cooling of the liquid. Extremely low losses of acrylonitrile, acetonitrile, etc., are experienced on recycling the salt solution which is saturated to a greater or lesser extent.

The lowest temperature at which satisfactory operation of the water scrubbing unit can be carried out amounts to 10° C.

The pressure under which the water scrubbing unit is operated is generally dependent upon the pressure of the alcohol scrubbing unit or the pressure of the overall system, this being generally between 1 and 11 atmospheres absolute.

The invention can be appiled not only to the recovery of acrylonitrile but is equally well applicable to the recovery of the reaction product produced by the conversion of olefins having more than 3 carbon atoms, such as isobutylene, butene, hexene, pentene, etc.

The following examples illustrate the way in which the process of the invention may be carried out in practice:

*Example 1*

8 liters of a catalyst consisting of 10.7% $MoO_3$, 12.7% $Bi_2O_3$, and 76.7% silica were filled into a synthesis tube having a length of 10 m. and an inside diameter of 32 mm., the tube being electrically heated by means of a diphyl jacket. Downstream of this tube there were arranged an air-cooled condenser and a water-cooled condenser each provided with receivers. The catalyst had been prepared from commercial molybdic acid containing about 85% $MoO_3$, bismuth nitrate $$(Bi(NO_3)_3 + 5H_2O)$$

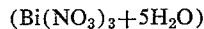

29 ml. conc. $HNO_3$ with the addition of a finely powdered silica (76.6%) and marketed as "Aerosil unpressed." After the addition of sufficient amounts of water to the starting components, the paste-like mass was shaped by means of a perforated plate to pellets having a diameter of 5 mm. and a length of about 1 to 5 mm. The mass was subsequently dried for 24 hours at 105° C. and thereafter calcined for 1 hour at 300° C.

Air in amount of 1200 normal liters per hour was saturated with water vapor at 66° C. by means of a water saturator and thereafter 180 normal liters of a $C_3$ mixture containing 62% of propylene (15.1 moles/hr.), the balance being propane and small amounts of $C_2$ hydrocarbons, and 76 normal liters (3.45 moles/hr.) of ammonia were admitted into the flow path just before entrance into the synthesis tube. The temperature existing between the saturator and the reactor was adjusted to about 100° C. to exclude any condensation of water.

The condensation of the reaction products in the exiting reaction gas was first effected by means of an air-cooled condenser at 45° C. and then by means of a water-cooled condenser at 18° C. The residual gas was subsequently passed through a two-stage alcohol washing unit.

This washing unit consisted of two series-connected tubes having an inside diameter of 70 mm. and which had a length of 1 meter (first stage) and 2.5 meters (second stage). The tubes were enclosed by a cooling jacket through which evaporating ammonia was passed and which was thoroughly insulated externally to avoid any loss by radiation. The gas was introduced from below in each stage. There was introduced at the top by means of a pump a $C_{10}$ alcohol (prepared by subjecting tripropylene to the oxo synthesis and subsequently hydrogenating the oxonation product). Fresh alcohol was used in each stage.

The temperature of the first stage was adjusted to −15° C. This did not result in any icing and substantially all of the water contained in the residual gas was condensed. Small amounts of ammonium carbonate or bicarbonate which simultaneously were formed did not separate but remained dissolved in the aqueous phase, and clogging of the washing unit was thereby avoided. The temperature of the second stage was −25° C.

The amount of alcohol charged to the first stage was 100 ml./hr. while that charged to the second stage was 300 ml./hr. The alcohol could be introduced in a cooled state (about −5° C.) or an uncooled state (about +15° C.).

Under these conditions, about 55% by weight of the total products contained in the synthesis gas (acrylonitrile, acetonitrile, hydrocyanic acid) were washed out in the first stage and the balance in the second stage. The combined efficiency of the two stages was 97 to 99% based on the total amount of reaction products contained in the residual gas (not counting $CO_2$ and CO). The loading of the first stage with reaction products amounted to 30% by weight and that of the second stage about 11% by weight.

The reaction products contained in the alcohol were isolated by distillation in superfractionation columns. Acrylonitrile having an excellent degree of purity was obtained in addition to pure hydrocyanic acid. Acetonitrile of high purity was also obtained.

The pressure before the first washing stage was 0.6 kg./cm.² gauge.

The alcohol obtained after having distilled off the reaction products could be recycled directly into the washing unit without requiring further special treatment.

In a further run, the temperature of the first stage was adjusted to −5° C. and that of the second stage was maintained at −25° C. In this case 35 to 40% of the total products which were scrubbed out in the two stages were recovered in the first stage, the balance being obtained in the second stage. The combined efficiency of the two stages was 96 to 98% based on the total of reaction products contained in the exiting synthesis.

If, under the temperature conditions of the first run, the amount of alcohol used in the first stage was doubled and that of the second stage was correspondingly reduced, then 70 to 75% by weight of the total of products obtained was scrubbed out in the first stage and the balance in the second stage. The combined efficiency of the two stages was substantially unchanged as compared with that of the preceding run.

A reduction of the pressure before the first scrubbing stage to 0.3 kg./cm.² gauge did not change the scrubbing effect.

If, instead of the $C_{10}$ alcohol of the previous runs, a $C_9$ alcohol prepared by subjecting diisobutylene to the oxo synthesis and subsequently hydrogenating the oxo synthesis products is used as the scrubbing medium, about 58% by weight of the products obtained were scrubbed out in the first stage and the balance in the second stage. The efficiency of the combined stages was 98 to 99%. This alcohol also could be reused without special treatment after the scrubbed out reaction products have been distilled off. However, it is advantageous if prior to the reuse drying is undertaken with, for example $CaCl_2$, to remove from the alcohol any existing although minor amounts of water.

Use, under the conditions of the first test, of a $C_7$ alcohol derived by the catalytic hydrogenation of carbon monoxide over specific iron catalysts at 30 kg./sq. cm. gauge (cf., for example, Ullmann's Encyclopaedie der technischen Chemie, 3rd edition, vol. 9, pp. 742–743) resulted in 52% by weight of the synthesis reacting products being scrubbed out in the first stage, the balance being recovered in the second stage. The efficiency was 94% based on the total of reaction products contained in the residual gas.

In still another run effected under the conditions of the first run fresh alcohol was only added at the top of the second washing stage and this alcohol was supplied to the top of the first washing stage after having passed through the second stage. The combined efficiency of the two stages under these conditions was between 95% and 98%.

When recovery of another nitrile, i.e. methacrylonitrile, was attempted, the results obtained were substantially the same.

*Example 2*

The preparation of the catalyst and the other reaction conditions were the same as in Example 1. After a service period of the catalyst of 2.5 months at a temperature of 390° C., the ammonia content downstream of the water-cooled condenser began to increase albeit under unchanged operating conditions. Up to this point, the ammonia content was 2.5 to 3 gms./normal cu. m. residual gas and it then slowly increased to 4 to 5 gms., indicating a slight decrease in catalytic activity. At this point, difficulties arose at irregular intervals in the alcohol scrubbing unit, these difficulties being due to the presence of solid carbonates of ammonia.

A small water washing unit having a length of 50 cm., an inside diameter of 10 cm. and having a filling capacity of 2.5 liters of water (without packing material) was inserted upstream of the alcohol scrubbing unit. The operating temperature of this scrubbing unit was room temperature, i.e., about 15° C. The ammonia content as a result could be decreased to 2–2.5 gms./normal cu. m. and the alcohol scrubbing unit again made to operate completely satisfactorily.

The alcohol scrubbing unit was operated with an alcohol which had been obtained by subjecting tripropylene to the oxo synthesis and then hydrogenating the oxo product.

The filling of the water scrubbing unit was renewed intermittently at intervals of 24 hours.

When starting operation with a new catalyst under the conditions of operation mentioned above, troubles in the alcohol scrubbing unit were also encountered, these being due to the low temperatures during the start-up period. If the water scrubbing unit was also operated from the beginning, no difficulties at all were experienced in the alcohol scrubbing unit.

*Example 3*

A reaction gas derived from the catalytic reaction of propylene, oxygen and ammonia still contained 3 gms. of unreacted ammonia per normal cu. m. after cooling to about room temperature. On being passed through a water scrubbing system, 75 to 80% of the ammonia contained in the gas were separated out in the form of, for example, soluble ammonium bicarbonate. The residual amount of ammonia entered the alcohol scrubbing unit and difficulties were experienced after 4 to 6 days of operation. Even though some amounts of ammonium carbonate could be found in the aqueous phase formed in the alcohol scrubbing unit and which were continuously withdrawn in addition to the alcohol used as the scrubbing medium, encrustations which aggravated the free gas passage through the scrubbing unit to a greater or lesser extent were found deposited in an on the filling bodies an opening the alcohol scrubbing unit.

When sulfuric acid in an amount of about 10 gms./liter was added to the water scrubbing unit (capacity, 3 liters), the resulting pH value was 1 to 2. During the subsequent operation, 2 normal cu. m./hr. of reaction gas were continuously passed through the scrubbing system, which corresponded to 6 gms./hr. of ammonia. This amount of ammonia is the stoichiometrical equivalent of 17 gms. $H_2SO_4$, based on neutral salt, and this amount was continuously introduced into the water scrubbing unit as a 60% acid by means of a small metering pump. The increased amount of liquid was brought to the initial liquid level by draining once per day. After about 4 days, the entire amount of liquid of the dater scrubbing unit had to be drained and replaced as the saturation level with ammonium sulfate had almost been reached. The alcohol scrubbing unit could now be operated for months without any shutdown since the reaction gas contained only 0.02 gms./normal cu. m. of ammonia after it had left the scrubbing unit. The portions of acrylonitrile, acetonitrile and hydrocyanic acid retained by the water scrubbing unit were very low. Evaporation of the scrubbing water resulted in recovery of a very pure ammonium sulfate.

When 10% sulfuric acid was used instead of the 60% sulfuric acid for neutralization under otherwise unchanged conditions and the liquid level of the scrubbing unit was kept constant by continuous withdrawal of the excess liquid, the water scrubbing unit could be operated for weeks without any difficulty.

A further run was carried out under the conditions described above except that a temperature of 40° C. was used in the water scrubbing unit which was previously operated at about 20° C. Renewal of the initial water was only necessary after 5 to 6 days. Part of the ammonium sulfate formed crystallized directly upon cooling and the balance was recovered by evaporation.

In a still further run, the previously used sulfuric acid was replaced by a 20% o-phosphoric acid in amount sufficient that 1 mol of acid was added per 2 moles of ammonia. The effect was substantially the same as in the case of using sulfuric acid. Only 0.03 gm. of ammonia could be found in the residual gas. Operation of the scrubbing unit was satisfactory even with twice the amount of ammonia in the residual gas. Of course, the amount of acid has to be increased correspondingly in that case.

When acetic acid in a 50% concentration was used in a further run, the consumption was somewhat in excess of the stoichiometrical requirement (about 1.03 to 1.05 moles of acetic acid per mole of ammonia). The residual content of ammonia in the reaction gas after scrubbing was 0.06 gm. per normal cu. m.

When the pressure which upstream of the water scrubbing unit was about 0.3 kg./sq. cm. gauge was increased to 2.5 kg./sq. cm. gauge, a substantially quantitative absorption of the ammonia present (4 gms .per normal cu. m.) was attained. The content of residual ammonia after scrubbing with water was insignificant even with an increase in the amount of ammonia to 10 gms. per normal cu. m.

We claim:

1. In the process of purifying crude low-molecular weight unsaturated nitriles selected from the group consisting of acrylonitrile and methacrylonitrile obtained in the vapor phase reaction of a member selected from the group consisting of propylene and i-butylene respectively, ammonia, oxygen, and steam, by scrubbing the reaction gases, the improvement which comprises the steps of
   (1) cooling said reaction gas;
   (2) scrubbing said cooled reaction gas with water at a temperature of from 0 to +50° C. following adjustment of the pH of the water to a value of between 1–6 by addition thereto of a member selected from the group consisting of sulfuric acid, phosphoric acid, formic acid, and acetic acid to remove therefrom the ammonia present in the reaction gas;
   (3) thereafter scrubbing the water-scrubbed reaction gas using, as scrubbing agent, at least one aliphatic alcohol having from 6–10 carbon atoms and prepared by the oxo-synthesis, said scrubbing taking place at a temperature below 20° C. in a pressure range up to 20 atmospheres gauge and in two stages.

2. Improvement according to claim 1, wherein said scrubbing with alcohol is effected in a first stage at a temperature of between 0° C. and −30° C. and in a second stage at a temperature between 0 and −50° C.

3. Improvement according to claim 1, which comprises effecting said scrubbing with water under conditions maintained so as to have a scrubbing capacity not exceeding 70% referred to the capacity of the succeeding alcohol scrubbing.

4. Improvement according to claim 1 in which said scrubbing with water is carried out using water, the pH of which has been adjusted to a value of between 3 and 5.

5. Improvement according to claim 1, wherein said scrubbing with alcohol is effected by using in the first stage thereof a loading of about 50 to 10,000 liters of reaction gas per liter of scrubbing agent and in said second stage a loading of from ½ to 1/10 that used in said first alcohol scrubbing stage.

References Cited by the Examiner

UNITED STATES PATENTS

| | | | |
|---|---|---|---|
| 2,702,300 | 2/1955 | Keller et al. | 260—465.9 X |
| 2,904,580 | 9/1959 | Idol | 260—465.3 |
| 2,987,451 | 6/1961 | Sennewald et al. | 260—465.9 X |
| 3,005,517 | 10/1961 | Idol et al. | 260—465.3 X |

FOREIGN PATENTS 941,428   4/1956   Germany.

OTHER REFERENCES

Distillers Ltd., German application 1,070,170, printed Dec. 3, 1959 (k1 12o 21), 4 pages spec.

CHARLES B. PARKER, *Primary Examiner.*